(12) United States Patent
Pfau

(10) Patent No.: US 11,634,151 B2
(45) Date of Patent: Apr. 25, 2023

(54) PROCESSOR AND PROCESSING METHOD FOR WARNING SYSTEM OF STRADDLE-TYPE VEHICLE, WARNING SYSTEM OF STRADDLE-TYPE VEHICLE, AND STRADDLE-TYPE VEHICLE

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/311,453

(22) PCT Filed: Nov. 21, 2019

(86) PCT No.: PCT/IB2019/060026
§ 371 (c)(1),
(2) Date: Jun. 7, 2021

(87) PCT Pub. No.: WO2020/115596
PCT Pub. Date: Jun. 11, 2020

(65) Prior Publication Data
US 2022/0024480 A1    Jan. 27, 2022

(30) Foreign Application Priority Data
Dec. 6, 2018 (JP) .............................. JP2018-228676

(51) Int. Cl.
*B60W 50/16* (2020.01)
*G06V 20/59* (2022.01)
(Continued)

(52) U.S. Cl.
CPC ........ *B60W 50/16* (2013.01); *B60W 30/0956* (2013.01); *B60W 40/08* (2013.01);
(Continued)

(58) Field of Classification Search
CPC .. B60W 50/16; B60W 30/0956; B60W 40/08; B60W 2554/803; B60W 2540/225;
(Continued)

(56) References Cited

U.S. PATENT DOCUMENTS 10,029,683 B1 *   7/2018  Ginther ................. B60W 40/08
10,977,878 B2 *   4/2021  Morishima ............... G07C 5/06
(Continued)

FOREIGN PATENT DOCUMENTS

DE   102011084367 A1 *  4/2013  ........... B60K 28/066
DE   102011084367 A1     4/2013
(Continued)

OTHER PUBLICATIONS

International Search Report and Written Opinion for Application No. PCT/IB2019/060026 dated May 4, 2020 (11 pages).

*Primary Examiner* — Mohamed Barakat
(74) *Attorney, Agent, or Firm* — Michael Best & Friedrich LLP

(57) ABSTRACT

The present invention obtains a processor, a processing method, a warning system, and a straddle-type vehicle capable of improving both the rider's safety and the rider's comfort.
A processor (20) includes: an acquisition section that acquires surrounding environment information corresponding to output of a surrounding environment detector (11) during travel of a straddle-type vehicle (100); a determination section that determines necessity of warning operation provided to the rider and generated by the warning system (1); and a control section that makes an alarm (30) perform the warning operation in the case where the determination section determines that the warning operation is necessary. The acquisition section further acquires helmet posture direction information corresponding to output of a helmet posture direction detector (13) during the travel of the
(Continued)

straddle-type vehicle (100). The determination section determines the necessity of the warning operation on the basis of the surrounding environment information and the helmet posture direction information.

13 Claims, 2 Drawing Sheets

(51) Int. Cl.
*B60W 30/095* (2012.01)
*B60W 40/08* (2012.01)
*B60W 50/14* (2020.01)

(52) U.S. Cl.
CPC ..... *G06V 20/597* (2022.01); *B60W 2050/143* (2013.01); *B60W 2050/146* (2013.01); *B60W 2300/36* (2013.01); *B60W 2540/223* (2020.02); *B60W 2540/225* (2020.02); *B60W 2540/229* (2020.02); *B60W 2554/803* (2020.02)

(58) Field of Classification Search
CPC ..... B60W 2540/229; B60W 2540/223; B60W 2050/143; B60W 2050/146; B60W 2300/36; G06V 20/597

See application file for complete search history.

(56) References Cited

U.S. PATENT DOCUMENTS

| | | | |
|---|---|---|---|
| 2014/0115759 A1* | 5/2014 | Tomlin | A63B 71/10 340/689 |
| 2016/0075338 A1* | 3/2016 | Henn | A42B 3/046 340/439 |
| 2016/0090037 A1* | 3/2016 | Tetsuka | B60W 50/16 340/435 |
| 2017/0247042 A1* | 8/2017 | Seidl | B60W 50/14 |

FOREIGN PATENT DOCUMENTS

| | | | | |
|---|---|---|---|---|
| DE | 102014223114 A1 * | 5/2016 | | B60W 30/09 |
| DE | 102014223114 A1 | 5/2016 | | |
| JP | 2009116882 A | 5/2009 | | |

\* cited by examiner

[FIG. 1]
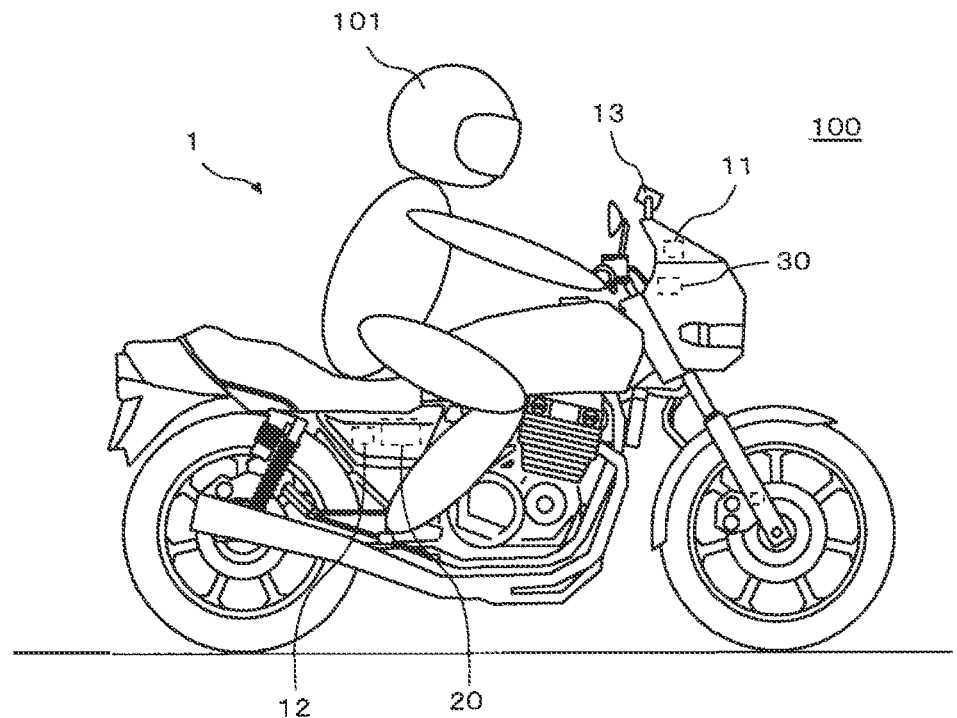
[FIG. 2]
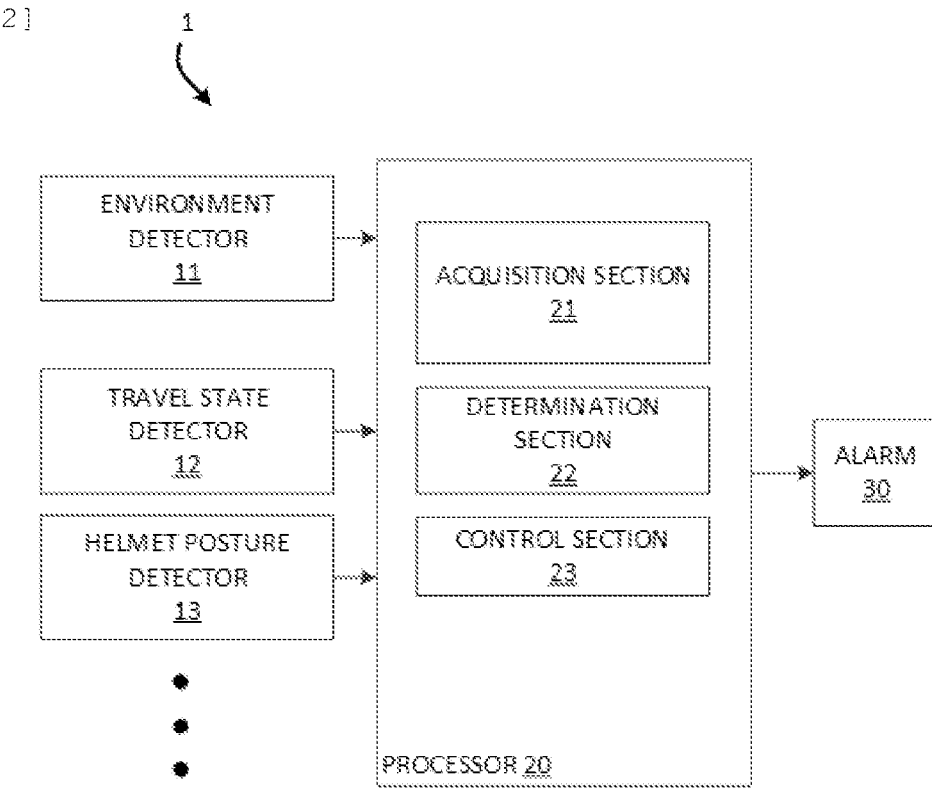

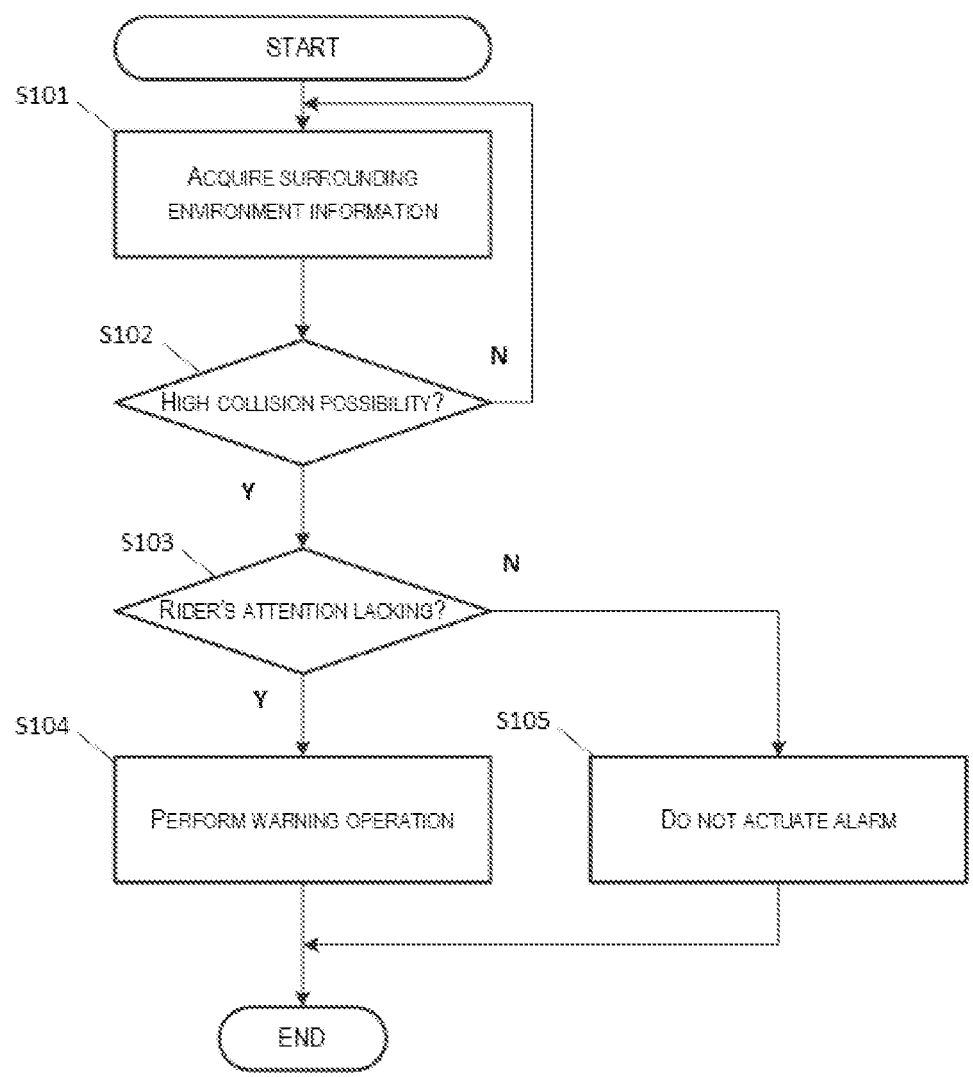

PROCESSOR AND PROCESSING METHOD FOR WARNING SYSTEM OF STRADDLE-TYPE VEHICLE, WARNING SYSTEM OF STRADDLE-TYPE VEHICLE, AND STRADDLE-TYPE VEHICLE

BACKGROUND OF THE INVENTION

The present invention relates to a processor and a processing method for a warning system that determines necessity of warning operation to a rider by using a surrounding environment detector provided to a straddle-type vehicle and performs warning operation when necessary, a warning system including the processor, and a straddle-type vehicle including the warning system.

As a technique related to a straddle-type vehicle, a warning system that acquires surrounding environment information about the straddle-type vehicle during travel by using a surrounding environment detector provided to the straddle-type vehicle and warns a rider according to the surrounding environment information has been known (for example, see JP-A-2009-116882).

SUMMARY OF THE INVENTION

Differing from other vehicles (an automobile and the like), the rider's body is exposed on the straddle-type vehicle, and the straddle-type vehicle falls at the slightest of opportunities. Accordingly, compared to the other vehicles (the automobile and the like), there are many situations where such surrounding environment that the rider should be given a warning occurs. However, in the case where warning operation is simply performed in all of those situations, the rider's comfort is deteriorated.

The present invention has been made with the above-described problem as the background and therefore obtains a processor and a processing method capable of improving both the rider's safety and the rider's comfort. The present invention also obtains a warning system that includes the processor. The present invention further obtains a straddle-type vehicle that includes the warning system.

Solution to Problem

A processor according to the present invention is a processor for a warning system of a straddle-type vehicle, and includes: an acquisition section that acquires surrounding environment information corresponding to output of a surrounding environment detector provided to the straddle-type vehicle during travel of the straddle-type vehicle; a determination section that determines necessity of warning operation provided to a rider and generated by the warning system on the basis of output of the acquisition section; and a control section that makes an alarm perform the warning operation in the case where the determination section determines that the warning operation is necessary. The acquisition section further acquires helmet posture direction information corresponding to output of a helmet posture direction detector during the travel of the straddle-type vehicle. The determination section determines the necessity of the warning operation on the basis of the surrounding environment information and the helmet posture direction information.

A warning system according to the present invention includes the above processor, the surrounding environment detector, and the helmet posture direction detector.

A straddle-type vehicle according to the present invention includes the above warning system.

A processing method according to the present invention is a processing method for a warning system of a straddle-type vehicle, and includes: an acquisition step of acquiring surrounding environment information, which corresponds to output of a surrounding environment detector provided to the straddle-type vehicle, by an acquisition section of a processor for the warning system during travel of the straddle-type vehicle; a determination step of determining necessity of warning operation, which is provided to a rider and generated by the warning system, by a determination section of the processor on the basis of output of the acquisition section; and a control step of making an alarm perform the warning operation by a control section of the processor in the case where the determination section determines that the warning operation is necessary. In the acquisition step, the acquisition section further acquires helmet posture direction information corresponding to output of a helmet posture direction detector during the travel of the straddle-type vehicle. In the determination step, the determination section determines necessity of the warning operation on the basis of the surrounding environment information and the helmet posture direction information.

Advantageous Effects of Invention

In the processor, the warning system, the straddle-type vehicle, and the processing method according to the present invention, the necessity of the warning operation is determined on the basis of the surrounding environment information and the helmet posture direction information. Thus, in the case where it can be estimated that the rider appropriately pays attention in a situation where such surrounding environment that the rider should be given a warning occurs, it is possible not to perform the warning operation. Therefore, it is possible to achieve both of improvement in safety and improvement in comfort of the rider.

BRIEF DESCRIPTION OF THE DRAWINGS

FIG. 1 is a view of a mounted state of a warning system according to an embodiment of the present invention on a straddle-type vehicle.

FIG. 2 is a system configuration diagram of the warning system according to the embodiment of the present invention.

FIG. 3 is a chart of an operation flow of a processor for the warning system according to the embodiment of the present invention.

DETAILED DESCRIPTION

A description will hereinafter be made on a processor, a warning system, a straddle-type vehicle, and a processing method according to the present invention with reference to the drawings.

Note that each of a configuration, operation, and the like, which will be described below, is merely one example, and the processor, the warning system, the straddle-type vehicle, and the processing method according to the present invention are not limited to a case with such a configuration, such operation, and the like.

For example, a description will hereinafter be made on a case where the warning system according to the present invention is used for a two-wheeled motor vehicle. However, the warning system according to the present invention may be used for the straddle-type vehicle other than the two-wheeled motor vehicle. The straddle-type vehicle means a vehicle in general that a rider straddles. The straddle-type vehicles include motorcycles (the two-wheeled motor vehicle and a three-wheeled motor vehicle), an all-terrain vehicle, a pedal-driven vehicle, and the like. The motorcycle includes: the two-wheeled motor vehicle or the three-wheeled motor vehicle that has an engine as a propelling source; the two-wheeled motor vehicle or the three-wheeled motor vehicle that has a motor as the propelling source; and the like, and includes a motorcycle, a scooter, an electric scooter, and the like, for example. The pedal-driven vehicle means a vehicle in general that can travel forward on a road by a depressing force applied to pedals by the rider. The pedal-driven vehicle includes a normal pedal-driven vehicle, an electrically-assisted pedal-driven vehicle, an electric pedal-driven vehicle, and the like.

The same or similar description will appropriately be simplified or will not be made below. In the drawings, the same or similar portions will be denoted by the same reference signs. In addition, a detailed structure will appropriately be depicted in a simplified manner or will not be depicted.

Embodiment

A description will hereinafter be made on a warning system according to an embodiment.
<Configuration of Warning System>
A description will be made on a configuration of the warning system according to the embodiment.

FIG. 1 is a view of a mounted state of the warning system according to the embodiment of the present invention on the straddle-type vehicle. FIG. 2 is a system configuration diagram of the warning system according to the embodiment of the present invention.

As illustrated in FIG. 1 and FIG. 2, a warning system 1 is mounted on a straddle-type vehicle 100. The warning system 1 at least includes: a surrounding environment detector 11 that detects surrounding environment ahead of the straddle-type vehicle 100; a travel state detector 12 that detects a travel state of the straddle-type vehicle 100; a helmet posture direction detector 13 that detects a posture direction state of a helmet 101 worn by a rider; a processor (ECU) 20; and an alarm 30.

The warning system 1 plays a role of recognizing a collision possibility ahead of the traveling straddle-type vehicle 100 by using the surrounding environment detector 11 and outputting a warning to the rider by using the alarm 30. The processor 20 acquires output of the surrounding environment detector 11, output of the travel state detector 12, and output of the helmet posture direction detector 13 and outputs a control command to the alarm 30. The processor 20 also receives output of various detectors (not illustrated) for detecting other information (for example, information on a brake operation state by the rider, information on an accelerator operation state by the rider, and the like). Each section of the warning system 1 may exclusively be used for the warning system 1, or may be shared with another system.

The surrounding environment detector 11 is a radar, a Lidar sensor, an ultrasonic sensor, a camera, or the like, for example, and continuously detects a distance and a direction of an object within a detection range from the straddle-type vehicle 100 during travel of the straddle-type vehicle 100. The surrounding environment detector 11 is preferably fixed to a portion of the straddle-type vehicle 100 that does not turn with a handlebar. The object may be an obstacle (for example, a vehicle, a guardrail, a wall, a person, or the like) or may be a vehicle that travels on the same lane.

The travel state detector 12 is a vehicle wheel speed sensor, an inertia sensor (IMU), or the like, for example, and detects a speed, acceleration, a roll angle, or the like generated on the straddle-type vehicle 100, for example, during the travel of the straddle-type vehicle 100.

The helmet posture direction detector 13 is a radar, a Lidar sensor, an ultrasonic sensor, a camera, or the like, for example, and detects a posture direction of the helmet 101 during the travel of the straddle-type vehicle 100. The helmet posture direction detector 13 is preferably fixed to the portion of the straddle-type vehicle 100 that does not turn with the handlebar. In particular, the helmet posture direction detector 13 is preferably the camera, the Lidar sensor, or the like, and in such a case, can easily detect the posture direction of the helmet 101 by extracting a characteristic portion (a shield edge or the like) of the helmet 101 through an image analysis. Alternatively, the helmet posture direction detector 13 may be provided to the helmet 101. For example, the helmet posture direction detector 13 may be an inertia sensor (IMU) that is provided to the helmet 101. Even in such a case, it is possible to detect the posture direction of the helmet 101 by deriving a difference of a detection value of the inertia sensor (IMU) from a detection value of the inertia sensor (IMU) as the travel state detector 12.

The processor 20 includes an acquisition section 21, a determination section 22, and a control section 23. The sections of the processor 20 may collectively be provided in a single casing or may separately be provided in multiple casings. The processor 20 may partially or entirely be constructed of a microcomputer, a microprocessor unit, or the like, may be constructed of a member in which firmware or the like can be updated, or may be a program module or the like that is executed by a command from a CPU or the like, for example.

During the travel of the straddle-type vehicle 100, the acquisition section 21 acquires surrounding environment information, which is information on the surrounding environment ahead of the straddle-type vehicle 100, on the basis of the output of the surrounding environment detector 11. During the travel of the straddle-type vehicle 100, the acquisition section 21 also acquires travel state information, which is information on the travel state of the straddle-type vehicle 100, on the basis of the output of the travel state detector 12. During the travel of the straddle-type vehicle 100, the acquisition section 21 further acquires helmet posture direction information, which is information corresponding to displacement of the helmet 101 from a reference state of the posture direction thereof, on the basis of the output of the helmet posture direction detector 13.

The determination section 22 specifies an advancing direction of the straddle-type vehicle 100 from the travel state information acquired by the acquisition section 21, and specifies an object, which is located in the advancing direction, and, a collision possibility of which should be determined, from the surrounding environment information acquired by the acquisition section 21. Then, the determination section 22 derives an index value I of the collision possibility of the straddle-type vehicle 100 against the object per the specified object. The determination section 22 determines per the object whether the derived index value I exceeds a reference value, and thereby determines whether there is the object with the high collision possibility in the advancing direction of the straddle-type vehicle 100.

The index value I may be a reciprocal of a relative distance Dr of the object to the straddle-type vehicle 100, may be a relative speed Vr of the object to the straddle-type vehicle 100, may be relative acceleration Ar of the object to the straddle-type vehicle 100, or a combination of those. For example, the index value I is a value that is defined by following Formula 1 or Formula 2. Alternatively, for example, the index value I may be a degree of a fluctuation of the relative distance Dr in a situation where the reciprocal of the relative distance Dr is large. The degree of the fluctuation may be duration in which a fluctuation amount of the relative distance Dr is kept to be equal to or smaller than a reference amount, or may be the fluctuation amount of the relative distance Dr in reference duration. Here, it means that the collision possibility becomes higher as the index value I is increased.

$$I = \frac{Vr}{Dr} \quad \text{[Formula 1]}$$

$$I = \frac{Ar}{-Vr - \sqrt{Vr^2 - 2 \times Ar \times Dr}} \quad \text{[Formula 2]}$$

The determination section 22 may simply specify the object, which is located within the detection range of the surrounding environment detector 11, that is, ahead of the straddle-type vehicle 100, and, the collision possibility of which should be determined, without specifying the advancing direction of the straddle-type vehicle 100, and may derive the index value I of the collision possibility against the object. That is, "ahead" in the present invention is defined as a whole area of the detection range of the surrounding environment detector 11. A determination on necessity of warning operation by using the "collision possibility of the straddle-type vehicle against the object ahead" in the present invention is defined as a concept that includes the determination on the necessity of the warning operation by using the collision possibility of the straddle-type vehicle 100 against the object located in the advancing direction.

The determination section 22 also determines whether the displacement of the posture direction of the helmet 101 from the reference state exceeds a reference amount and/or determines whether duration of the state exceeds reference duration from the helmet posture direction information acquired by the acquisition section 21, so as to determine whether the rider's appropriate attention to the advancing direction lacks. The reference state is defined as the posture direction of the helmet 101 in a state where the rider's face is oriented in the advancing direction. The reference state may be set and stored in advance in the processor 20 or may be learned by and stored in the processor 20 during the travel of the straddle-type vehicle 100. The determination section 22 may determine whether the rider's attention to the front lacks. In such a case, the reference state is defined as the posture direction of the helmet 101 in a state where the rider's face is oriented to the front.

The displacement may be defined as a displaced angle in a vehicle width direction of the straddle-type vehicle 100, may be defined as a displaced angle in a vehicle height direction of the straddle-type vehicle 100, or may be a combination of those. Alternatively, the displacement in a global coordinate system may be derived by using the travel state information (for example, a roll angle, a pitch angle, or the like generated on the straddle-type vehicle 100) acquired by the acquisition section 21, and the displacement may be compared to the reference amount.

In the case where the object, the collision possibility of which is high, is present in the advancing direction of the straddle-type vehicle 100 and where the rider's appropriate attention lacks, the determination section 22 determines that the warning operation is necessary. On the other hand, in the case where at least one of them is not satisfied, the determination section 22 determines that the warning operation is unnecessary. When the determination section 22 determines that the warning operation is necessary, the control section 23 makes the alarm 30 perform the warning operation.

The alarm 30 may warn the rider by sound (that is, a sensation through an auditory organ as a sensory organ), may warn the rider by a display (that is, a sensation through a visual organ as the sensory organ), may warn the rider by vibrations (that is, a sensation through a tactile organ as the sensory organ), or may warn the rider by a combination of those. More specifically, the alarm 30 is a speaker, a display, a lamp, a vibrator, or the like, may be provided to the straddle-type vehicle 100, or may be provided to an accessory such as the helmet 101 that is associated with the straddle-type vehicle 100. Furthermore, the alarm 30 may be constructed of a single output device or may be constructed of multiple output devices of the same type or different types. The multiple output devices may be provided integrally or may be provided separately.

When making the alarm 30 perform the warning operation, the control section 23 changes initiation timing thereof in accordance with the helmet posture direction information. For example, the control section 23 expedites the initiation timing as the displacement of the posture direction of the helmet 101 from the reference state is increased. Alternatively, for example, the control section 23 expedites the initiation timing as the duration of the state where the displacement exceeds the reference amount extends.

<Operation of Warning System>

A description will be made on operation of the warning system according to the embodiment.

FIG. 3 is a chart of an operation flow of the processor for the warning system according to the embodiment of the present invention.

The processor 20 repeatedly executes the operation flow illustrated in FIG. 3 during the travel of the straddle-type vehicle 100.

(Acquisition Step)

In step S101, the acquisition section 21 acquires the surrounding environment information that corresponds to the output of the surrounding environment detector 11. The acquisition section 21 also acquires the travel state information that corresponds to the output of the travel state detector 12. The acquisition section 21 further acquires the helmet posture direction information that corresponds to the output of the helmet posture direction detector 13.

(Determination Step)

In step S102, the determination section 22 determines whether there is the object with the high collision possibility in the advancing direction or in front of the straddle-type vehicle 100 on the basis of the information acquired in step S101. If Yes, the processing proceeds to step S103. If No, the processing returns to step S101.

In step S103, the determination section 22 determines whether the rider's attention to the advancing direction or the front lacks on the basis of the information acquired in step S101. If Yes, the processing proceeds to step S104. If No, the processing proceeds to step S105.

(Control Step)

In step S104, the control section 23 makes the alarm 30 perform the warning operation. In step S105, the control section 23 does not actuate the alarm 30.

In step S105, notification operation to which the rider is less sensitive than to the warning operation performed in step S104 may be performed. The notification operation is preferably notification operation of such extent that the rider's comfort is not deteriorated. For example, in step S105, the less intense sound, display, vibration, or the like than the warning operation performed in step S104 may be output, the sound, the display, the vibration, or the like may be output in a longer cycle than that of the warning operation performed in step S104, or the notification operation to the different tactile organ with less sensitivity than that in the warning operation performed in step S104 may be performed.

<Effects of Warning System>

A description will be made on effects of the warning system according to the embodiment.

The processor 20 includes: the acquisition section 21 that acquires the surrounding environment information corresponding to the output of the surrounding environment detector 11 during the travel of the straddle-type vehicle 100; the determination section 22 that determines the necessity of the warning operation, which is performed by the warning system 1, to the rider on the basis of the output of the acquisition section 21; and the control section 23 that makes the alarm 30 perform the warning operation in the case where the determination section 22 determines that the warning operation is necessary. The acquisition section 21 further acquires the helmet posture direction information that corresponds to the output of the helmet posture direction detector 13 during the travel of the straddle-type vehicle 100. The determination section 22 determines the necessity of the warning operation on the basis of the surrounding environment information and the helmet posture direction information. Thus, in the case where it can be estimated that the rider appropriately pays the attention in a situation where such surrounding environment that the rider should be given a warning occurs, it is possible not to perform the warning operation. Therefore, it is possible to achieve both of improvement in safety and improvement in the comfort of the rider.

Preferably, the surrounding environment information includes the surrounding environment information ahead of the straddle-type vehicle 100, and the determination section 22 determines the necessity of the warning operation by using the index value I of the collision possibility of the straddle-type vehicle 100 against the object that is located ahead of the straddle-type vehicle 100. The rider is more likely to pay attention to the front than to a side, rear, and the like. Thus, in regard to the collision against the object that is located ahead, a situation where the rider does not need the warning operation is likely to occur. Therefore, the above-described configuration is particularly useful in the situation where the collision against the object located ahead is warned.

In particular, the index value I is preferably a value that is changed according to at least one of the relative distance Dr, the relative speed Vr, and the relative acceleration Ar of the straddle-type vehicle 100 to the object located ahead of the straddle-type vehicle 100. With such a configuration, the necessity of the warning operation is reliably determined.

In particular, the helmet posture direction information is preferably information that corresponds to the displacement of the posture direction of the helmet 101, which is worn by the rider, from the reference state. The determination section 22 preferably determines the necessity of the warning operation on the basis of the duration of the state where the displacement exceeds the reference amount. For example, in the case where the duration falls below the reference duration, the determination section 22 determines that the warning operation is unnecessary. With such a configuration, the determination on the necessity of the warning operation is simplified.

Preferably, in the case where the determination section 22 determines that the warning operation is unnecessary, the control section 23 does not actuate the alarm 30. With such a configuration, the improvement in the rider's comfort is promoted.

Preferably, in the case where the determination section 22 determines that the warning operation is unnecessary, the control section 23 makes the alarm 30 perform the notification operation to which the rider is less sensitive than to the warning operation. With such a configuration, the rider can easily recognize that the warning system 1 functions without any problem, and the rider thus can have a sense of safety.

Preferably, the control section 23 changes the initiation timing of the warning operation in accordance with the helmet posture direction information. With such a configuration, the rider can be warned at the appropriate timing that corresponds to the state of the attention paid by the rider. Therefore, it is possible to promote both of the improvement in the safety and the improvement in the comfort of the rider.

Preferably, the helmet posture direction detector 13 includes the camera. In addition, the helmet posture direction detector 13 preferably includes the LIDAR sensor. With such a configuration, detection accuracy of the posture direction of the helmet 101 is improved.

The description has been made so far on the embodiment. However, the present invention is not limited to the description of the embodiment. That is, the present invention includes modified versions of the embodiment that has been described so far.

For example, the description has been made so far on the case where the object located ahead of the straddle-type vehicle 100 is recognized by using the surrounding environment detector 11, which detects the surrounding environment ahead of the straddle-type vehicle 100, and the necessity of the warning operation about the object is determined. However, the object located in a different direction (on the side, at the rear, or the like) of the straddle-type vehicle 100 may be recognized by using the surrounding environment detector 11, which detects the surrounding environment in the different direction (on the side, at the rear, or the like) of the straddle-type vehicle 100, and the necessity of the warning operation about the object may be determined.

For example, the description has been made so far on the case where the determination section 22 determines the necessity of the warning operation only on the basis of the surrounding environment information and the helmet posture direction information. However, in addition to the surrounding environment information and the helmet posture direction information, the determination section 22 may take different information from those into consideration to determine the necessity of the warning operation. For example, the different information may be the information on the brake operation state by the rider. Alternatively, for example, the different information may be the information on the travel state (the speed, deceleration, or the like) of the straddle-type vehicle 100. Further alternatively, for example, the different information may be information on an eye direction of the rider that is acquired according to output of an eye direction detector (not illustrated) provided to the helmet 101. For example, the different information may be the information on the eye direction of the rider that is acquired according to the output of the helmet posture direction detector 13, and the determination section 22 may determine the necessity of the warning operation by appropriately using the information on the eye direction of the rider and the helmet posture direction information, which is acquired according to the output of the helmet posture direction detector 13, differently.

For example, the description has been made on the case where determination criteria used for the determination in the determination section 22 are set in advance. However, the determination criteria may be set manually by the rider.

For example, the description has been made on the case where step S102 is executed prior to step S103. However, step S102 may be executed after step S103. That is, only in the case where it is determined that the rider's appropriate attention lacks, it may be determined whether the object, the collision possibility of which is high, is present.

REFERENCE SIGNS LIST

1: Warning system
11: Surrounding environment detector
12: Travel state detector
13: Helmet posture direction detector
20: Processor
21: Acquisition section
22: Determination section
23: Control section
30: Alarm
100: Straddle-type vehicle
101: Helmet

The invention claimed is:

1. A processor (20) for a warning system (1) of a straddle-type vehicle (100), the processor (20) configured to:
acquire surrounding environment information corresponding to output of a surrounding environment detector (11) provided to the straddle-type vehicle (100) during travel of the straddle-type vehicle (100);
determine a necessity of a warning operation provided to a rider and generated by the warning system (1) based on the output; and
make an alarm (30) perform the warning operation in the case where the processor (20) determines that the warning operation is necessary, wherein
the processor (20) is further configured to acquire helmet posture direction information corresponding to output of a helmet posture direction detector (13) during the travel of the straddle-type vehicle (100), and
determine the necessity of the warning operation based on the surrounding environment information and the helmet posture direction information,
wherein the helmet posture direction information is information that corresponds to a displacement of a posture direction of a helmet (101) worn by the rider from a reference state, which is a state where a rider's face is oriented in an advancing direction of the straddle-type vehicle (100) and wherein processor (20) makes the alarm (30) in response to the displacement of the posture direction of the helmet (10) exceeding a displacement reference amount, and wherein the displacement of the posture direction of the helmet (101) is defined as a displacement angle in a direction of a width of the straddle-type vehicle (100) and a displacement angle in a direction of a height of the straddle-type vehicle (100).

2. The processor (20) according to claim 1, wherein the surrounding environment information includes information on surrounding environment ahead of the straddle-type vehicle (100), and the processor (20) determines the necessity of the warning operation by using an index value (I) of a collision possibility of the straddle-type vehicle (100) against an object located ahead of the straddle-type vehicle (100).

3. The processor (20) according to claim 2, wherein the index value (I) is a value that is changed according to at least one of a relative distance (Dr), a relative speed (Vr), and relative acceleration (Ar) of the straddle-type vehicle (100) to the object.

4. The processor (20) according to claim 2, wherein the processor (20) is further configured to determine the necessity of the warning operation based on a duration of a state where the displacement exceeds a reference amount.

5. The processor (20) according to claim 4, wherein the processor (20) is further configured to determine that the warning operation is unnecessary in the case where the duration falls below the reference duration.

6. The processor (20) according to claim 1, wherein the processor (20) does not actuate the alarm (30) in the case where the processor (20) determines that the warning operation is unnecessary.

7. The processor (20) according to claim 1, wherein the processor (20) makes the alarm (30) perform a notification operation to which the rider is less sensitive to than to the warning operation, in the case where the processor (20) determines that the warning operation is unnecessary.

8. The processor (20) according to claim 1, wherein the processor (20) changes initiation timing of the warning operation according to the helmet posture direction information.

9. A warning system (1) for a straddle-type vehicle (100) comprising:
a surrounding environment detector (11);
a helmet posture direction detector (13); and
a processor (20) configured to
acquire surrounding environment information corresponding to output of the surrounding environment detector (11) during travel of the straddle-type vehicle (100),
determine a necessity of a warning operation provided to a rider and generated by the warning system (1) based on the output, and
make an alarm (30) perform the warning operation in the case where the processor (20) determines that the warning operation is necessary,
wherein the processor (20) is further configured to acquire helmet posture direction information corresponding to output of the helmet posture direction detector (13) during the travel of the straddle-type vehicle (100) and
determine the necessity of the warning operation based on the surrounding environment information and the helmet posture direction information, and
wherein the helmet posture direction information is information that corresponds to a displacement of a posture direction of a helmet (101) worn by the rider from a reference state, which is a state where a rider's face is oriented in an advancing direction of the straddle-type vehicle (100) and wherein the alarm (30) is made in response to the displacement of the posture direction of the helmet (10) exceeding a displacement reference amount, and wherein the displacement of the posture direction of the helmet (101) is defined as a displacement angle in a direction of a width of the straddle-type vehicle (100) and a displacement angle in a direction of a height of the straddle-type vehicle (100).

10. The warning system (1) according to claim 9, wherein the helmet posture direction detector (13) includes a camera.

11. The warning system (1) according to claim 9, wherein the helmet posture direction detector (13) includes a LIDAR sensor.

12. A straddle-type vehicle (100) comprising: the warning system (1) according to claim 10.

13. A processing method for a warning system (1) of a straddle-type vehicle (100), the processing method comprising:
  acquiring surrounding environment information, which corresponds to output of a surrounding environment detector (11) provided to the straddle-type vehicle (100), by an acquisition section (21) of a processor (20) for the warning system (1) during travel of the straddle-type vehicle (100);
  determining necessity of warning operation, which is provided to a rider and generated by the warning system (1), by a determination section (22) of the processor (20) on the basis of the output; and
  making an alarm (30) perform the warning operation in the case where the processor (20) determines that the warning operation is necessary, wherein
  the processor (20) further acquires helmet posture direction information corresponding to output of a helmet posture direction detector (13) during the travel of the straddle-type vehicle (100) and
  determines a necessity of the warning operation based on the surrounding environment information and the helmet posture direction information,
wherein the helmet posture direction information is information that corresponds to a displacement of a posture direction of a helmet (101) worn by the rider from a reference state, which is a state where a rider's face is oriented in an advancing direction of the straddle-type vehicle (100) and wherein the alarm (30) is made in response to the displacement of the posture direction of the helmet (10) exceeding a displacement reference amount, and wherein the displacement of the posture direction of the helmet (101) is defined as a displacement angle in a direction of a width of the straddle-type vehicle (100) and a displacement angle in a direction of a height of the straddle-type vehicle (100).

* * * * *